(12) United States Patent
Graham et al.

(10) Patent No.: US 11,686,066 B2
(45) Date of Patent: Jun. 27, 2023

(54) WORKING MACHINE JOYSTICK ASSEMBLY

(71) Applicant: J.C. BAMFORD EXCAVATORS LIMITED, Uttoxeter (GB)

(72) Inventors: Alina Graham, Uttoxeter (GB); David Garcia Corrochano, Uttoxeter (GB); Thomas Freethy, Uttoxeter (GB)

(73) Assignee: J.C. BAMFORD EXCAVATORS LIMITED, Uttoxeter (GB)

( * ) Notice: Subject to any disclaimer, the term of this patent is extended or adjusted under 35 U.S.C. 154(b) by 2 days.

(21) Appl. No.: 16/412,229

(22) Filed: May 14, 2019

(65) Prior Publication Data
US 2019/0345690 A1 Nov. 14, 2019

(30) Foreign Application Priority Data
May 14, 2018 (GB) .................................... 1807820

(51) Int. Cl.
*E02F 9/20* (2006.01)
*G05G 9/047* (2006.01)
(Continued)

(52) U.S. Cl.
CPC ............ *E02F 9/2004* (2013.01); *B60K 26/02* (2013.01); *B62D 11/003* (2013.01); *G05G 9/047* (2013.01);
(Continued)

(58) Field of Classification Search
CPC .............. G05G 9/047; G05G 9/04737; G05G 2009/04714; G05G 2009/0474; H01H 25/04; H01H 25/06
See application file for complete search history.

(56) References Cited

U.S. PATENT DOCUMENTS 6,025,686 A * 2/2000 Wickert ................. E02F 3/435
318/568.18
6,129,155 A * 10/2000 Lombardi ............... E02F 3/845
172/2
(Continued)

FOREIGN PATENT DOCUMENTS

EP 0628976 A1 12/1994
EP 1 518 819 A2 3/2005
(Continued)

OTHER PUBLICATIONS

Search Report for GB Application No. 1807820.4, dated Oct. 24, 2018.
(Continued)

*Primary Examiner* — Bobby Rushing, Jr.
(74) *Attorney, Agent, or Firm* — Marshall, Gerstein & Borun LLP (57) ABSTRACT

A joystick assembly for a working machine having a working arm includes a controller configured to control a plurality of machine functions, a first electronic joystick in communication with the controller, and actuators in communication with the controller. Each actuator is configured to actuate a function associated with the working arm. The first electronic joystick comprises four axes of movement, and the first electronic joystick is configured to transmit electronic signals to the controller in response to being displaced along an axis from a neutral position. The controller is configured to receive the electronic signals from the first electronic joystick, and to transmit an electrical signal to one or more actuators to actuate the actuators. The joystick assembly is configured such that the controller actuates a different actuator for controlling a different function associated with the working arm, dependent upon the axis of displacement of the first electronic joystick.

15 Claims, 5 Drawing Sheets

(51) Int. Cl.
  *B60K 26/02* (2006.01)
  *B62D 11/00* (2006.01)
  *E02F 3/32* (2006.01)

(52) U.S. Cl.
  CPC .... *G05G 9/04737* (2013.01); *B60K 2026/029* (2013.01); *E02F 3/325* (2013.01)

(56) References Cited

U.S. PATENT DOCUMENTS

| | | | | |
|---|---|---|---|---|
| 6,140,787 | A * | 10/2000 | Lokhorst | E02F 3/435 318/568.18 |
| 6,282,453 | B1 | 8/2001 | Lombardi | |
| 6,400,352 | B1 * | 6/2002 | Bruneau | G09B 9/28 345/156 |
| 6,542,789 | B2 * | 4/2003 | Ufheil | G05B 19/04 700/275 |
| 6,863,144 | B2 * | 3/2005 | Brandt | B62D 7/1509 180/333 |
| 8,521,371 | B2 * | 8/2013 | Faivre | G05B 19/106 701/50 |
| 8,894,346 | B2 * | 11/2014 | Lewis | E02F 3/34 414/685 |
| 9,650,759 | B2 * | 5/2017 | Dolan | E02F 9/2228 |
| 9,777,461 | B2 * | 10/2017 | Wuisan | E02F 9/2004 |
| 2005/0257973 | A1 | 11/2005 | Szymanski et al. | |
| 2009/0198414 | A1 * | 8/2009 | Mohning | B62D 1/12 701/41 |
| 2016/0032564 | A1 * | 2/2016 | Pinther, II | E02F 3/3414 60/327 |
| 2016/0306379 | A1 * | 10/2016 | Zils | G05G 1/06 |
| 2017/0058488 | A1 * | 3/2017 | Wright | E02F 9/2271 |
| 2017/0293319 | A1 * | 10/2017 | Michel | A01G 3/037 |
| 2018/0058039 | A1 * | 3/2018 | Fredrickson | E02F 9/2012 |

FOREIGN PATENT DOCUMENTS

| | | | |
|---|---|---|---|
| EP | 3054367 A2 | 8/2016 | |
| EP | 2508680 B1 * | 9/2018 | E02F 9/2029 |
| GB | 2527334 A | 12/2015 | |
| KR | 20110022100 A * | 3/2011 | |
| WO | WO-99/05368 A1 | 2/1999 | |

OTHER PUBLICATIONS

Extended European Search Report for European Patent Application No. 19173566.1, dated Nov. 19, 2019.
Examination Report for GB Patent Application 1807820.4, dated Feb. 16, 2021.
Examination Report for Indian Patent Application No. 201914018460, dated Mar. 30, 2022.

* cited by examiner

WORKING MACHINE JOYSTICK ASSEMBLY

FIELD OF THE INVENTION

The present invention relates to a working machine joystick assembly; to a system for controlling a working machine; and to a working machine.

BACKGROUND OF THE INVENTION

A working machine generally comprises a working arm and a working implement attached thereto. The working machine may be in the form of a materials handling vehicle or earth moving vehicle such as an excavator, a telescopic handler, a backhoe loader etc., and the working implement may be a bucket, a shovel, forks etc.

A joystick control system is generally used to control the primary functions of the working arm/implement, such as lifting, lowering, swinging right and left, and curling/dumping of a working implement. Foot controls, i.e. foot pedals, are also provided in order to control movement of the working machine, which may need to be used in conjunction with an actuation button lever on or near the joystick control system. Additional foot or hand controls may also be provided to control auxiliary functions of the working machine, such as lifting and lowering of a dozer blade.

Thus, in known systems, two joysticks are required to be provided to control the functions of the working arm and implement. Further, in addition to both operator's hands being required for controlling the working arm and implement, the operator's feet are also required to move the working machine. This can result in a relatively complex control arrangement that may not be intuitive for operators to learn.

It is desirable to provide a joystick control system that is able to control all of the functions associated with movement of a working arm via a single joystick.

It is further desirable that such a joystick control system includes a second joystick for controlling movement of the working machine, without requiring the use of foot pedals.

The present invention seeks to overcome, or at least mitigate, one or more problems associated with the prior art.

SUMMARY OF THE INVENTION

According to a first aspect of the invention, there is provided a working machine joystick assembly for controlling a working machine of the type having a body, a working arm attached to the body, a working implement attached to a distal end of the working arm, and a drive arrangement for propelling the working machine, the joystick assembly comprising: a controller configured and arranged to control a plurality of functions of a working machine; a first electronic joystick in communication with the controller; and a plurality of actuators in communication with the controller, each actuator configured to actuate a function associated with a working arm of a working machine; wherein the first electronic joystick comprises four axes of movement, and wherein the first electronic joystick is configured to transmit electronic signals to the controller in response to being displaced along an axis from a neutral position; wherein the controller is configured to receive the electronic signals from the first electronic joystick, and to transmit an electrical signal to one or more of the plurality of actuators to actuate said actuators; and wherein the joystick assembly is configured such that the controller actuates a different actuator for controlling a different function associated with the working arm, dependent upon the axis of displacement of the first electronic joystick.

By providing a four axis joystick, four different functions associated with the working arm are able to be controlled using a single joystick. This arrangement improves the ease of controlling movement of the working arm for an operator.

Through the invention, the need for a second joystick for controlling the functions of the working arm is removed, which frees up space within a confined operator cab.

The joystick assembly may be configured such that the controller actuates one or more of the actuators upon displacement of the first electronic joystick along each axis of movement.

The first electronic joystick may comprise five axes of movement or comprises six axes of movement.

The functions associated with the working arm may comprise one or more of: pivoting of a working arm with respect to a working machine body; pivoting of a boom of a working arm with respect to a body of a working machine; pivoting of a dipper of a working arm with respect to a boom of a working arm; slewing of a working arm with respect to a body of a working machine; lateral movement of a working arm with respect to a body of a working machine; crowding of a working implement; curling/dumping movement of a working implement; and/or slewing of a body of a working machine with respect to a drive arrangement.

Thus, all functions associated with movement of the working arm are controlled by the first joystick.

The axes of movement of the first electronic joystick may be selected from an x-axis (side to side), a y-axis (front to back), a z-axis (up and down), a twist axis (rotational), and two tilt axes.

Displacement of the first electronic joystick in the x-axis, y-axis and z-axis from a neutral position directly may control movement of the working implement in three-dimensional space with respect to the body of a working machine.

This configuration of the first electronic joystick provides a direct correlation between movement of the joystick and movement of the working implement. This further improves and simplifies the control arrangement for an operator.

Rotational movement of the first electronic joystick may control slewing of the body about a vertical axis with respect to the drive arrangement.

Displacement of the first electronic joystick in first tilt axis may actuate curling and dumping of the working implement.

Displacement of the first electronic joystick from the neutral position may be directly proportional to the rate of movement of the working arm.

This further aids the ease of use of the joystick to control the working arm and working implement.

The joystick assembly may further comprise a second electronic joystick in communication with the controller. The second electronic joystick may be configured to transmit electronic signals to the controller in response to the second electronic joystick being displaced along an axis from a neutral joystick position. The controller may be configured to receive the electronic signals from the second electronic joystick and to transmit an electrical signal to one or more of the plurality of actuators associated with the drive arrangement of a working machine.

Thus, controlling functions of the working arm, and the drive controls, is carried out using two joysticks. Thus, it is not necessary to provide separate foot controls to operate the drive arrangement of the working machine, thus improving the ease of use of the working machine.

Displacement of the second electronic joystick in the x-axis may actuate steering of the working machine. Displacement of the second electronic joystick in the y-axis may actuate the drive arrangement to propel the working machine.

This arrangement provides a simple mechanism for driving a working machine, without requiring an operator to operate foot pedals.

The second electronic joystick may comprise four, five or six axes of movement.

The controller may be configured to receive electronic signals from the second electronic joystick and to transmit an electrical signal to one or more of the plurality of actuators associated with ancillary functions of a working machine.

According to a second aspect of the invention, there is provided a system for controlling a working machine of the type having a body, a working arm attached to the body, a working implement attached to a distal end of the working arm, and a drive arrangement for propelling the working machine, the system comprising: a controller configured and arranged to control a plurality of functions of a working machine; a first electronic joystick in communication with the controller; and a plurality of actuators in communication with the controller, each actuator configured to actuate a plurality of functions associated with a working arm of a working machine; wherein the first electronic joystick comprises four axes of movement, and wherein the first electronic joystick is configured to transmit electronic signals to the controller in response to being displaced along an axis from a neutral position; wherein the controller is configured to receive the electronic signals from the first electronic joystick, and to transmit an electrical signal to one or more of the plurality of actuators to actuate said actuators; and wherein the system is configured such that the controller actuates different actuator for controlling a different function associated with the working arm, dependent upon the axis of displacement of the first electronic joystick.

It will be appreciated that the system of the second aspect may comprise any of the optional features associated with the first aspect.

According to a third aspect of the invention, there is provided a working machine comprising: a body; a drive arrangement for propelling the working machine; a working arm connected to the body; a working implement connected to a distal end of the working arm; and a joystick assembly comprising a controller configured and arranged to control a plurality of functions of the working machine, a first electronic joystick in communication with the controller, and a plurality of actuators in communication with the controller, each actuator configured to actuate a function of the working machine, wherein the first electronic joystick comprises four axes of movement, wherein the first electronic joystick is configured to transmit electronic signals to the controller in response displacement of the first electronic joystick along an axis from a neutral position, wherein the controller is configured to receive the electronic signals from the electronic joystick, and to transmit an electrical signal to one or more of the plurality of actuators to actuate said actuators, and wherein the controller actuates a different actuator dependent upon the axis of displacement of the first electronic joystick.

The axes of movement of the first electronic joystick may be selected from an x-axis (side to side), a y-axis (front to back), a z-axis (up and down), a twist axis (rotational), and two tilt axes.

The working arm functions may comprise one or more of: pivoting of the working arm with respect to the body; slewing of the working arm with respect to the body; lateral movement of the working arm; crowding of the working implement; and/or curling and dumping of the working implement.

The body may be rotatable with respect to the drive arrangement, and the working machine functions may comprise slewing of the body about a vertical axis with respect to the drive arrangement.

The first electronic joystick may comprise five axes of movement or six axes of movement.

The working arm may comprise a boom and dipper arm, and the working arm functions may comprise pivoting of the boom with respect to the body, and pivoting of the dipper arm with respect to the boom.

Displacement of the first electronic joystick in the x-axis, y-axis and z-axis from a neutral joystick position may directly control movement of the working implement in three-dimensional space with respect to the body.

This configuration of the first electronic joystick provides a direct correlation between movement of the joystick and movement of the working implement. This provides a simple to understand control system.

Displacement of the first electronic joystick in first tilt axis may actuate curling and dumping of the working implement.

The body may be rotatable with respect to the drive arrangement, and rotational movement of the first electronic joystick may control slewing of the body about a vertical axis with respect to the drive arrangement.

The working machine may further comprise a second electronic joystick in communication with the controller. The second electronic joystick may be configured to transmit electronic signals to the controller in response to the second electronic joystick being displaced along an axis from a neutral joystick position. The controller may be configured to receive the electronic signals from the second electronic joystick and to transmit an electrical signal to one or more of the plurality of actuators associated with the drive arrangement.

Displacement of the second electronic joystick in the x-axis may actuate steering of the working machine, and displacement of the second electronic joystick in the y-axis may actuate the drive arrangement to propel the working machine.

BRIEF DESCRIPTION OF THE DRAWINGS

Embodiments of the invention will now be described with reference to the accompanying drawings, in which.

DETAILED DESCRIPTION

Figure 1A:
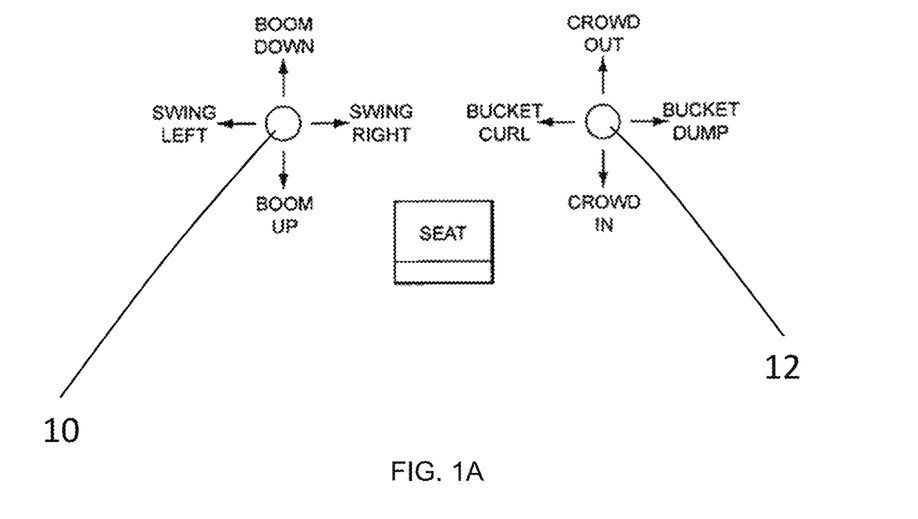
FIGS. 1A and 1B are example of a known joystick configurations.
Figure 1B:
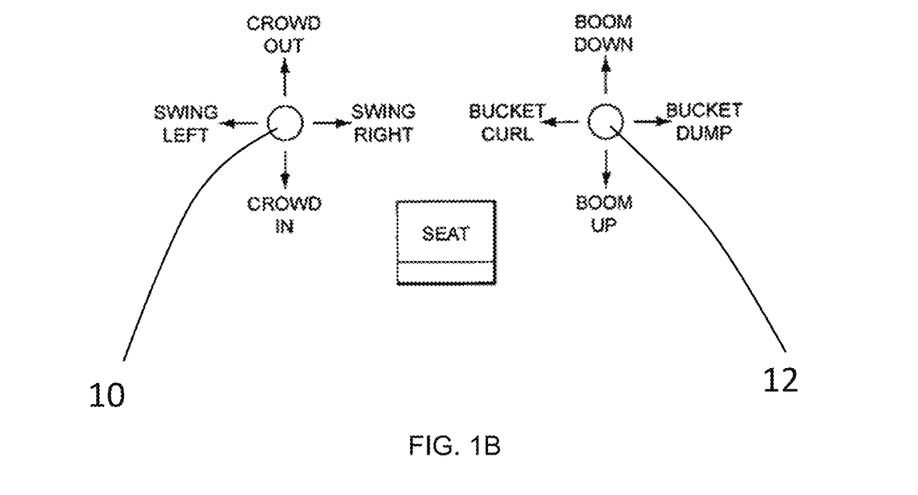

Referring firstly to FIGS. 1A and 1B, two known joystick control system configurations are shown. In such known joystick configurations, the two joysticks have two axes of movement, and are pivotable in a y-axis direction (i.e. pivotable forwards and backwards) and in an x-axis direction (i.e. pivotable side-to-side) about a fixed point.

In the example of FIG. 1A, raising and lowering of a boom of a working arm, and slewing of a working arm are controlled by pivoting of a first joystick 10 along the y-axis direction and x-axis direction, respectively. Crowding in and out of a working dipper arm (stick) of a working arm, and curling/dumping of a working implement are then controlled by pivoting of a second joystick 12 along the y-axis direction and x-axis direction, respectively. This is referred to as the ISO control pattern.

In the example of FIG. 1B, raising and lowering of a boom of a working arm, and curling/dumping of a working implement are controlled by pivoting of a second joystick 12 along the y-axis direction and x-axis direction, respectively. Crowding in and out of a working dipper arm (stick) of a working arm, and slewing of a working arm are then controlled by pivoting of a first joystick 10 along the y-axis direction and x-axis direction, respectively. This is referred to as the SAE control pattern.

In both of these arrangements, it is known for working machines to be provided with separate foot or hand controls that operate tracking or movement of the working machine (i.e. turning, and propelling of the working machine).

The provision of two separate joysticks to control the functions of a working arm and implement increases the complexity of operation of the working arm. Additionally, the provision of separate foot or hand controls for controlling movement, in addition to the two joysticks, further increases the complexity of operation of the working machine. Further, the provision of three of four separate operator controls take up space in what may be a confined operator cabin.

Figure 2:
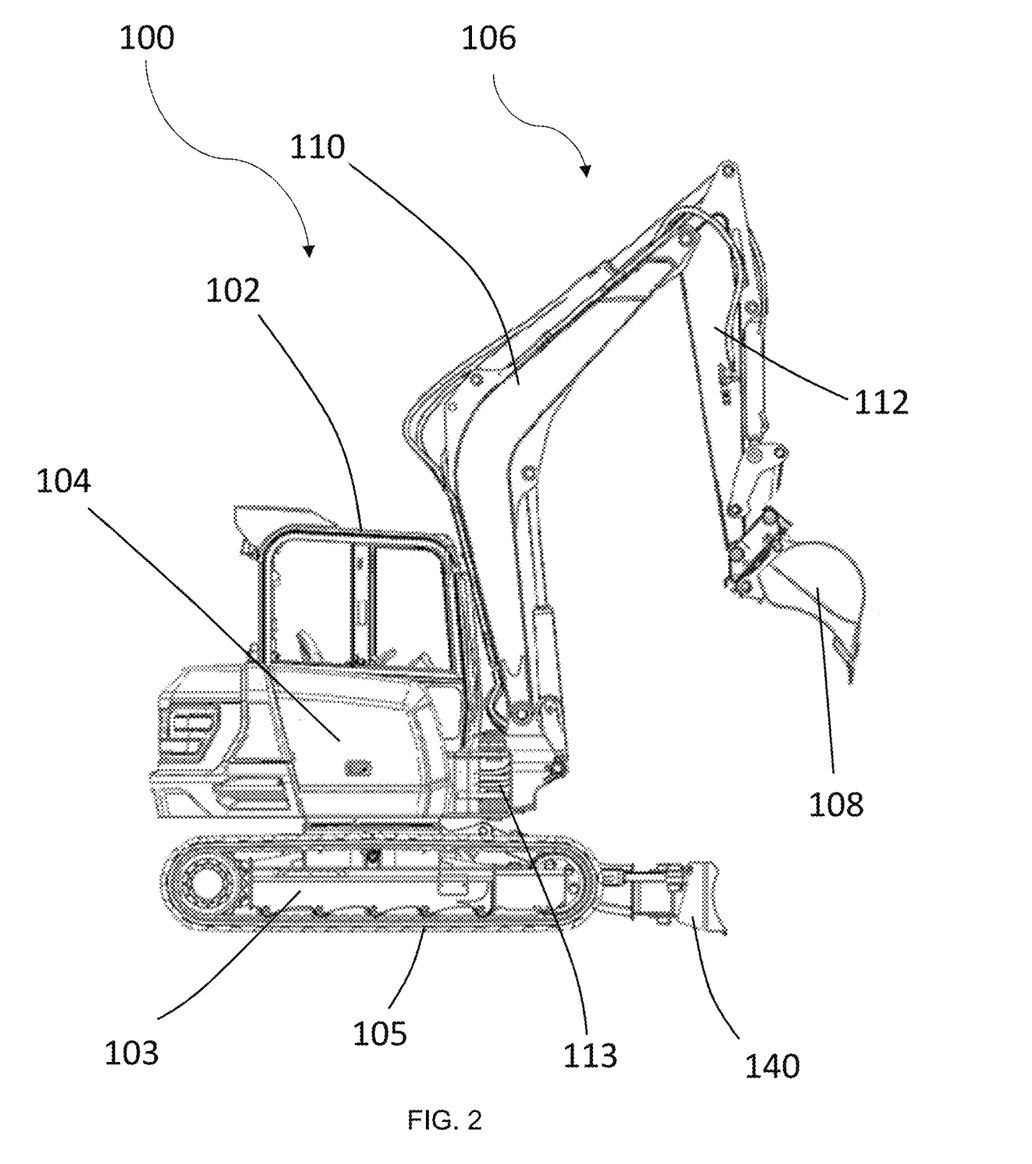
FIG. 2 is a side view of a working machine according to the invention.

In use, the joystick assembly is provided within an operator cab 102 of a working machine 100 (as shown in FIG. 2). The working machine 100 may be in the form of a materials handling vehicle such as a loading shovel, telescopic handler, an excavator, a backhoe loader, a wheeled loader, a skid steer loader etc.

In the illustrated embodiment, the working machine 100 is a tracked slew excavator, and includes a body 104, a working arm 106 attached to the body 104, and a working implement 108 attached to a distal end of the working arm 106. The body 104, also known as a superstructure, is rotatably supported on an undercarriage 103, which mounts a drive arrangement 105 for propelling the working machine 100 (in this embodiment tracks).

The working arm 106 is capable of pivoting about a substantially vertical axis relative to the body 104 by using a "kingpost" interface 113 to the superstructure.

In the illustrated embodiment, the working arm 106 includes a boom 110 pivotally connected to the body 104, and a dipper arm 112 pivotally connected to the boom 110. The working implement 108 is connected to a distal end of the dipper arm 112. In alternative arrangements (e.g. of a loading shovel telescopic handler or skid steer loader), the working arm may be provided as a single component. In further alternate embodiments, the working machine may have wheels for propulsion, and for the body may not rotate relative the drive arrangement.

Figure 3:
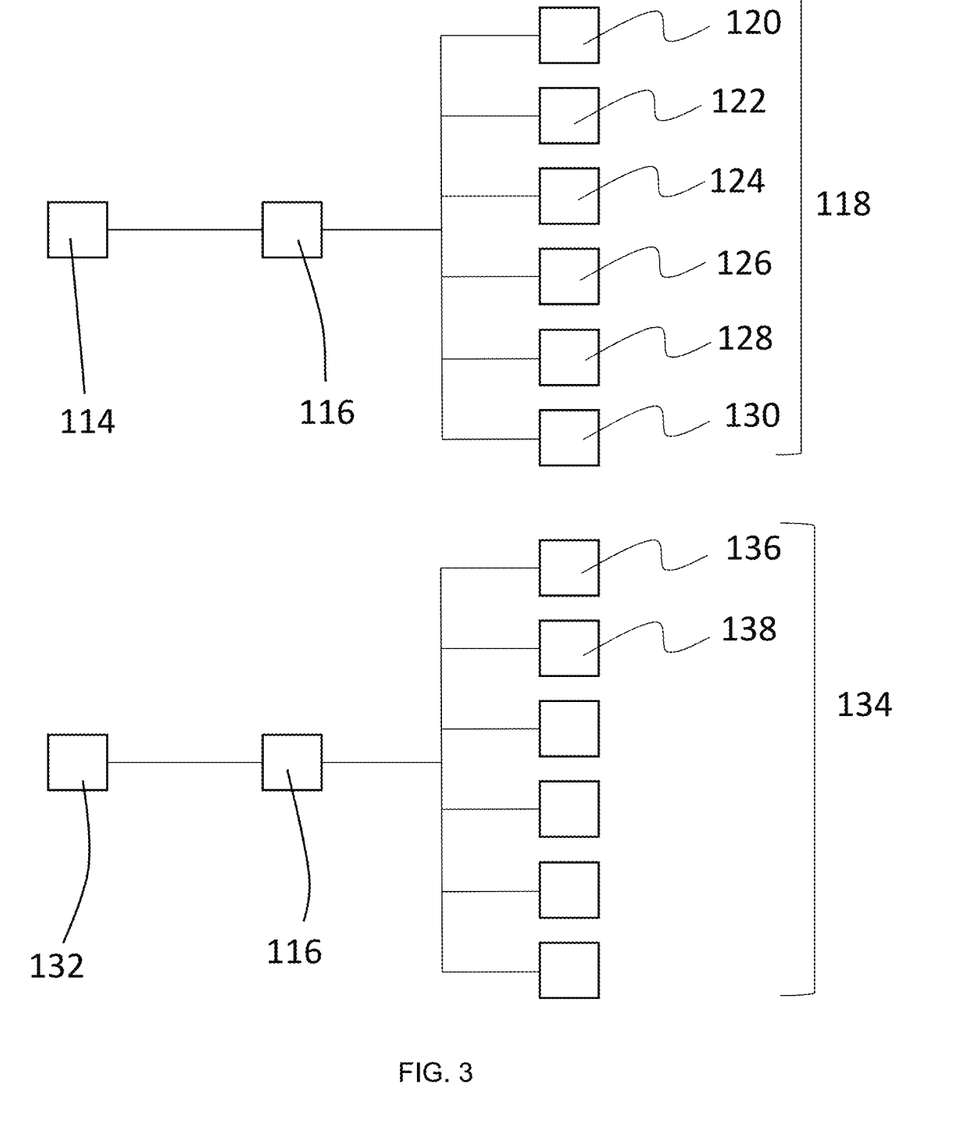
FIG. 3 is a schematic diagram of the control system according to the invention.
Figure 4:
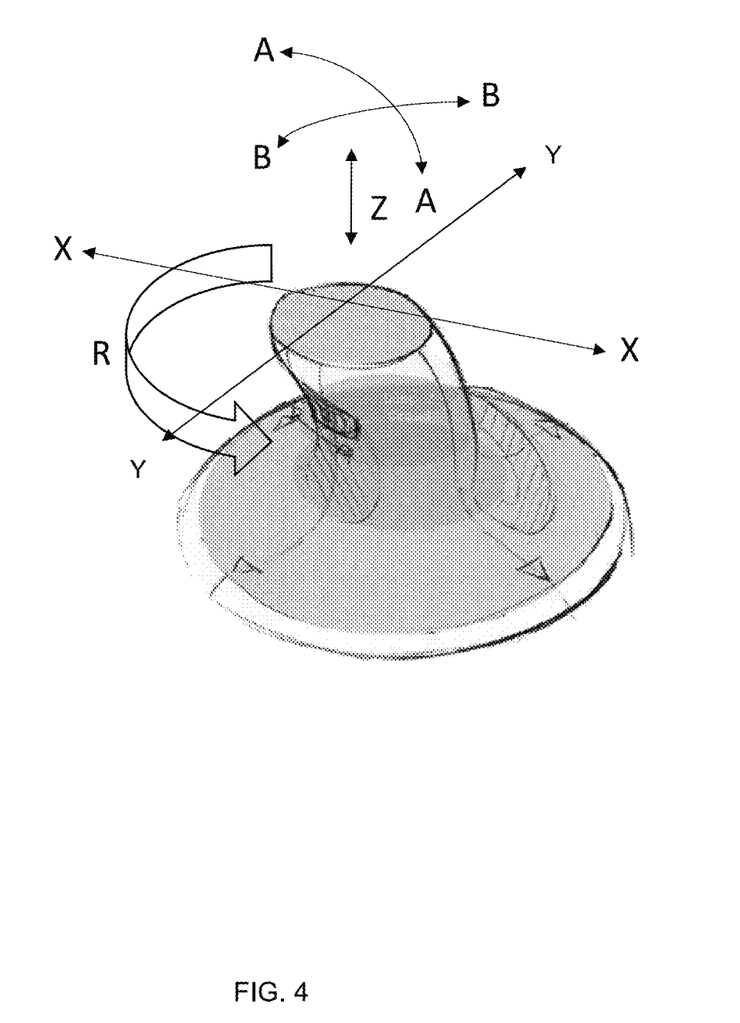
FIG. 4 is a schematic view of a joystick according to the invention.
Figure 5:
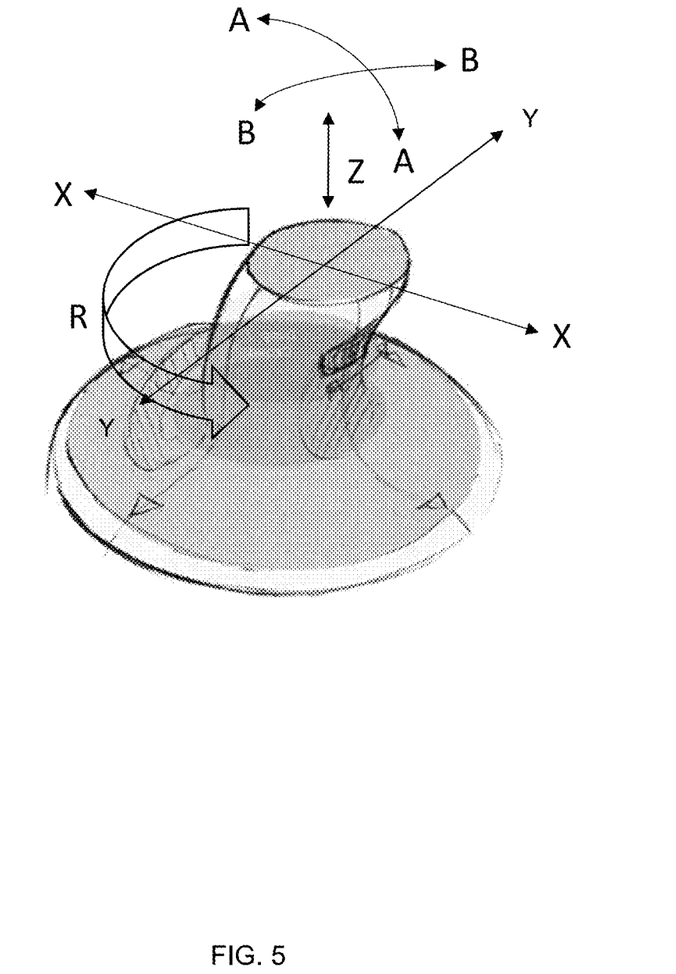
FIG. 5 is a schematic view of a joystick according to the invention.

Referring to FIGS. 3 to 5, a joystick assembly according to the present invention is shown.

The joystick assembly is configured to control working arm related functions of the working machine 100. The joystick assembly includes a first electronic joystick 114, and a controller 116 configured and arranged to control functions of the working machine 100. The first electronic joystick 114 is communicatively connected with the controller 116, and the first electronic joystick 114 transmits electronic signals to the controller 116 in response to being displaced from a neutral, or rest, position. Communication may be via a CAN bus or similar communication protocol.

The joystick assembly further includes a series of actuators 118. Each of the actuators 118 is configured to actuate a different function associated with the working arm 106 of the working machine 100. Each of the actuators 118 is communicatively connected to the controller 116.

In use, the first electronic joystick 114 generates an electrical signal upon being displaced from a neutral position. The first electronic joystick 114 is moveable/displaceable along six axes. Displacement along each of the six axes results in a different electrical signal being transmitted to the controller.

The controller 116 receives the electronic signals from the first electronic joystick 114. In turn, the controller actuates different actuator, based on the axis of displacement of the joystick 114, in order to control different working arm functions. Put another way, the controller 116 actuates one or more of the actuators 118 upon displacement of the first electronic joystick 114 along each axis of movement.

The axes of displacement of the first electronic joystick 114 define: a y-axis (i.e. a forward and backward translational movement of the joystick); an x-axis (i.e. side to side or lateral translational movement of the joystick 114); a z-axis (i.e. up and down movement of the joystick 114); a twist axis (i.e. rotational movement of the joystick 114); a first tilt axis (i.e. pivoting of the joystick about a forwards-backwards tilt A); and a second tilt axis (i.e. pivoting of the joystick about a side-to-side tilt B). It will be appreciated that in some arrangements, i.e. for certain types of working machine, the first electronic joystick may only be displaceable along four or five of the above axes, dependent upon the number of functions required.

The working arm functions controlled by the first electronic joystick 114 relate to one or more of: pivoting of the boom 110 respect to the working machine body 104; pivoting of the dipper arm 112 with respect to the boom 110; slewing of the working arm 106 with respect to the body 104; curling/dumping movement of the working implement 108; and/or rotation of the body 104 with respect to the drive arrangement 105.

It will be appreciated that, in embodiments where the working arm 106 is a unitary component, the functions will include pivoting of the working arm 106 with respect to the body 104 of the working machine 100.

Further, in alternate arrangements where the body 104 is fixed with respect to the drive arrangement 105 (such as a backhoe loader), the kingpost 113 may be mounted to the body 104 via a guide rail so as to be able to move laterally with respect to the body. In such arrangements, the functions will include effecting lateral movement of the working arm 106 with respect to the body 104.

By providing a six axis joystick, six different functions of the working arm are able to be controlled using a single joystick. The amount of displacement of the first electronic joystick 114 from the neutral position is directly proportional to the rate of movement of the boom 110, dipper arm 112, and/or working implement 108.

In the illustrated embodiment, the actuators 118 include: a first actuator 120 for slewing the working arm 114 with respect to the body 104; a second actuator 122 for pivoting of the boom 110 with respect to the body 104; a third actuator 124 for pivoting of the dipper arm 112 with respect to the boom 110; a fourth actuator 126 for slewing the body 104 with respect to the drive arrangement 105; and a fifth actuator 128 for curling and dumping of the working implement 108. The actuators 118 further include a sixth actuator 130. It will be appreciated that the number of actuators provided will correspond to the number of axes of displacement of the first electronic joystick 114.

In the illustrated embodiment, the actuators 118 are hydraulic actuators, and the joystick assembly is configured to actuate spool valves (not shown) via a solenoid arrangement (not shown) associated with each of the actuators 118 to selectively supply fluid to the hydraulic actuator to control the function of the working arm 106.

In the exemplary illustrated embodiment, displacement of the joystick 114 in the z-axis (up and down) actuates pivoting of the boom 110 with respect to the working machine body 104 about a horizontal axis. Rotational movement of the joystick 114 actuates slewing of the body 104 about a vertical axis with respect to the drive arrangement 105. Displacement of the joystick 114 in first tilt axis (forwards-backwards pivoting) actuates curling and dumping of the working implement 108. Displacement of the joystick 114 in the second tilt axis (side-to-side pivoting) actuates crowding in and out of the dipper 112. Displacement of the joystick 114 in the x-axis (side-to-side translational movement) actuates slewing of the working arm 106 with respect to the body 104.

This arrangement has been found to provide an intuitive control of working arm functions for a machine of this embodiment. Other machines may have alternative arrangements tailored to make their operation intuitive.

In one arrangement, the controller is configured such that movement of the joystick 114 in the x-axis, y-axis and z-axis from a neutral position directly controls movement of the working implement 108 in three-dimensional space with respect to the position of the body 104. This three-dimensional space is defined by the limit of movement of the working implement 108 along the three axes, and outlines a first work area. The first electronic joystick 114 may optionally provide haptic feedback (e.g. increased resistance to displacement by the operator) when the working implement is at the limit of movement along each of the three axes as a further aid to usability.

In this arrangement, the direct link between movement in one axis and movement of a particular actuator is broken. Rather, the controller interprets the joystick displacement and converts this into the required combination of actuator extension/retraction movements to achieve a corresponding displacement of the implement 108. This direct correlation between movement of the joystick 114 and movement of the working implement 108 further improves and simplifies the control arrangement for an operator.

In order to move the working implement 108 from a first working area (e.g. to pick up material with the working implement 108) to a second working area (e.g. to deposit material from the working implement 108), the body 104 must be rotated/slewed. Thus, rotational movement of the joystick 114 actuates slewing of the body 104 about a vertical axis with respect to the drive arrangement 105, so as to change the work area. Pivoting of the joystick 114 in the first tilt axis (forwards-backwards) actuates curling and dumping of the working implement 108.

The joystick assembly further includes a second electronic joystick 132. The second electronic joystick 132 is communicatively connected with the controller 116, and the second electronic joystick 132 transmits electronic signals to the controller 116 in response to being displaced from a neutral, or rest, position. Communication may be via a CAN bus or similar communication protocol.

The joystick assembly further includes a second series of actuators 134. Each of the actuators 134 is in communicatively connected to the controller 116.

In use, the second electronic joystick 132 generates an electrical signal upon being displaced from a neutral position. The second electronic joystick 132 is moveable/displaceable along six axes. Displacement along each of the six axes results in a different electrical signal being transmitted to the controller.

The controller 116 receives the electronic signals from the second electronic joystick 132. In turn, the controller 116 actuates different actuator, based on the axis of displacement of the joystick 132, in order to control different functions. Put another way, the controller 116 actuates one or more of the actuators 134 upon displacement of the second electronic joystick 132 along each axis of movement.

The axes of displacement of the second electronic joystick 132 define: a y-axis (i.e. a forward and backward translational movement of the joystick); an x-axis (i.e. side to side or lateral translational movement of the joystick 114); a z-axis (i.e. up and down movement of the joystick 114); a twist axis (i.e. rotational movement of the joystick 114); a first tilt axis (i.e. pivoting of the joystick about a forwards-backwards tilt A); and a second tilt axis (i.e. pivoting of the joystick about a side-to-side tilt B). It will be appreciated that in some arrangements, i.e. for certain types of working machine, the first electronic joystick may only be displaceable along four or five of the above axes, dependent upon the number of functions required.

Two of the actuators 136, 138 are configured to actuate different functions associated with the drive arrangement 105 of the working machine 100.

Displacement of the second electronic joystick 132 in the x-axis (side-to-side movement) actuates the actuator 136 to effect steering of the working machine 100. Displacement of the second electronic joystick 132 in the y-axis (forwards-backwards movement) actuates the actuator 138 to propel the working machine 100. This arrangement provides a simple mechanism for driving a working machine 100, without requiring an operator to operate foot pedals, thus freeing up space within the operator compartment.

The remaining four axes of movement of the second electronic joystick 132 may be used to control ancillary functions of the working machine 100. Such ancillary controls may be the raising/lowering of a dozer blade 140 a horn, an idle button. The first or second joystick may have one or more switches (not shown) to actuate the actuators associated with said ancillary functions.

As a result of the invention, it is not necessary to provide separate foot or hand controls to operate the drive arrangement of the working machine, thus improving the ease of use of the working machine.

While the invention has been described with reference to a "joystick", it will be appreciated that the invention relates to a working machine control assembly comprising a hand held input device. The input device may be in the form of a joystick (as described), a knob, a lever, or similar device.

Although the invention has been described above with reference to one or more preferred embodiments, it will be appreciated that various changes or modifications may be made without departing from the scope of the invention as defined in the appended claims.

The invention claimed is:

1. A working machine joystick assembly for controlling a working machine of the type having a body, a working arm attached to the body, a working implement attached to a distal end of the working arm, and a drive arrangement for propelling the working machine, the joystick assembly comprising:
   a controller configured and arranged to control a plurality of functions of a working machine;
   a first electronic joystick in communication with the controller; and
   a plurality of actuators in communication with the controller, each actuator configured to actuate a function associated with a working arm of a working machine;
   wherein the first electronic joystick comprises four axes of movement comprising side to side movement along an x-axis, front to back movement along a y-axis, and up and down movement along a z-axis,
   wherein the first electronic joystick is configured to transmit electronic signals to the controller in response to being displaced along an axis from a neutral position;
   wherein the controller is configured to receive the electronic signals from the first electronic joystick, and to transmit an electrical signal to one or more of the plurality of actuators to actuate said actuators;
   wherein the joystick assembly is configured such that the controller actuates a different actuator for controlling a different function associated with the working arm, dependent upon the axis of displacement of the first electronic joystick;
   wherein displacement of the first electronic joystick along the x-axis, y-axis and z-axis from a neutral position directly controls movement of the working implement in three-dimensional space with respect to the body of a working machine such that displacement of the first electronic joystick along the x-axis, y-axis and z-axis controls movement of the working implement along the x-axis, y-axis and z-axis, respectively, to provide a direct correlation between displacement of the first electronic joystick and movement of the working implement in three-dimensional space; and
   wherein the body is configured to rotate with respect to the drive arrangement, and wherein rotational movement of the first electronic joystick controls slewing of the body about a vertical axis with respect to the drive arrangement.

2. The joystick assembly according to claim 1, wherein displacement of the first electronic joystick in a first tilt axis actuates curling and dumping of the working implement.

3. The joystick assembly as defined in claim 1, wherein displacement of the first electronic joystick from the neutral position is directly proportional to the rate of movement of the working arm.

4. The joystick assembly as defined in claim 1, further comprising a second electronic joystick in communication with the controller, wherein the second electronic joystick is configured to transmit electronic signals to the controller in response to the second electronic joystick being displaced along an axis from a neutral joystick position, further wherein the controller is configured to receive the electronic signals from the second electronic joystick and to transmit an electrical signal to one or more of the plurality of actuators associated with the drive arrangement of a working machine.

5. The joystick assembly as defined in claim 4, wherein displacement of the second electronic joystick in the x-axis actuates steering of the working machine, and wherein displacement of the second electronic joystick in the y-axis actuates the drive arrangement to propel the working machine.

6. The joystick assembly as defined in claim 1, wherein the first electronic joystick comprises five axes of movement or comprises six axes of movement, and wherein the joystick is configured such that the controller actuates one or more of the actuators upon displacement of the first electronic joystick along each axis of movement.

7. A working machine comprising:
   a body;
   a drive arrangement for propelling the working machine, where the body is rotatable with respect to the drive arrangement about a vertical axis;
   a working arm connected to the body;
   a working implement connected to a distal end of the working arm; and
   a working machine joystick assembly comprising:
      a controller configured and arranged to control a plurality of functions of a working machine;
      a first electronic joystick in communication with the controller; and
      a plurality of actuators in communication with the controller, each actuator configured to actuate a function associated with a working arm of a working machine;
   wherein the first electronic joystick comprises four axes of movement selected from side to side movement along an x-axis, front to back movement along a y-axis, up and down movement along a z-axis, a twisting rotational movement about the z-axis, a first tilt axis pivoting about the y-axis, and a second tilt axis pivoting about the x-axis, the first electronic joystick configured to transmit electronic signals to the controller in response to being displaced along an axis from a neutral position;
   wherein the controller is configured to receive the electronic signals from the first electronic joystick, and to transmit an electrical signal to one or more of the plurality of actuators to actuate said actuators;
   wherein the joystick assembly is configured such that the controller actuates a different actuator for controlling a different function associated with the working arm, dependent upon the axis of displacement of the first electronic joystick, and
   wherein the rotational movement of the first electronic joystick about the z-axis controls the rotational movement of the body about the vertical axis with respect to the drive arrangement.

8. The working machine as defined in claim 7, configured such that the controller actuates one or more of the actuators upon displacement of the first electronic joystick along each axis of movement.

9. The working machine as defined in claim 7, wherein the first electronic joystick comprises five axes of movement or comprises six axes of movement.

10. The working machine as defined in claim 7, wherein the functions associated with the working arm comprise one or more of: pivoting of a working arm with respect to a working machine body; pivoting of a boom of a working arm with respect to a body of a working machine; pivoting of a dipper of a working arm with respect to a boom of a working arm; slewing of a working arm with respect to a body of a working machine; lateral movement of a working arm with respect to a body of a working machine; crowding of a working implement; curling/dumping movement of a working implement; and/or slewing of a body of a working machine with respect to a drive arrangement.

11. The working machine as defined in claim 7, wherein displacement of the first electronic joystick in the x-axis, y-axis and z-axis from a neutral position directly controls movement of the working implement in three-dimensional space with respect to the body of a working machine.

12. The working machine according to claim 7, wherein displacement of the first electronic joystick in first tilt axis actuates curling and dumping of the working implement.

13. The working machine as defined in claim 7, wherein displacement of the first electronic joystick from the neutral position is directly proportional to the rate of movement of the working arm.

14. The working machine as defined in claim 7, further comprising a second electronic joystick in communication with the controller, wherein the second electronic joystick is configured to transmit electronic signals to the controller in response to the second electronic joystick being displaced along an axis from a neutral joystick position, further wherein the controller is configured to receive the electronic signals from the second electronic joystick and to transmit an electrical signal to one or more of the plurality of actuators associated with the drive arrangement of a working machine.

15. The working machine as defined in claim 7, wherein displacement of the second electronic joystick in the x-axis actuates steering of the working machine, and wherein displacement of the second electronic joystick in the y-axis actuates the drive arrangement to propel the working machine.

* * * * *